Nov. 19, 1929.   F. B. THOMAS   1,736,019
DOOR AND BRAKE CONTROL DEVICE
Filed April 23, 1928
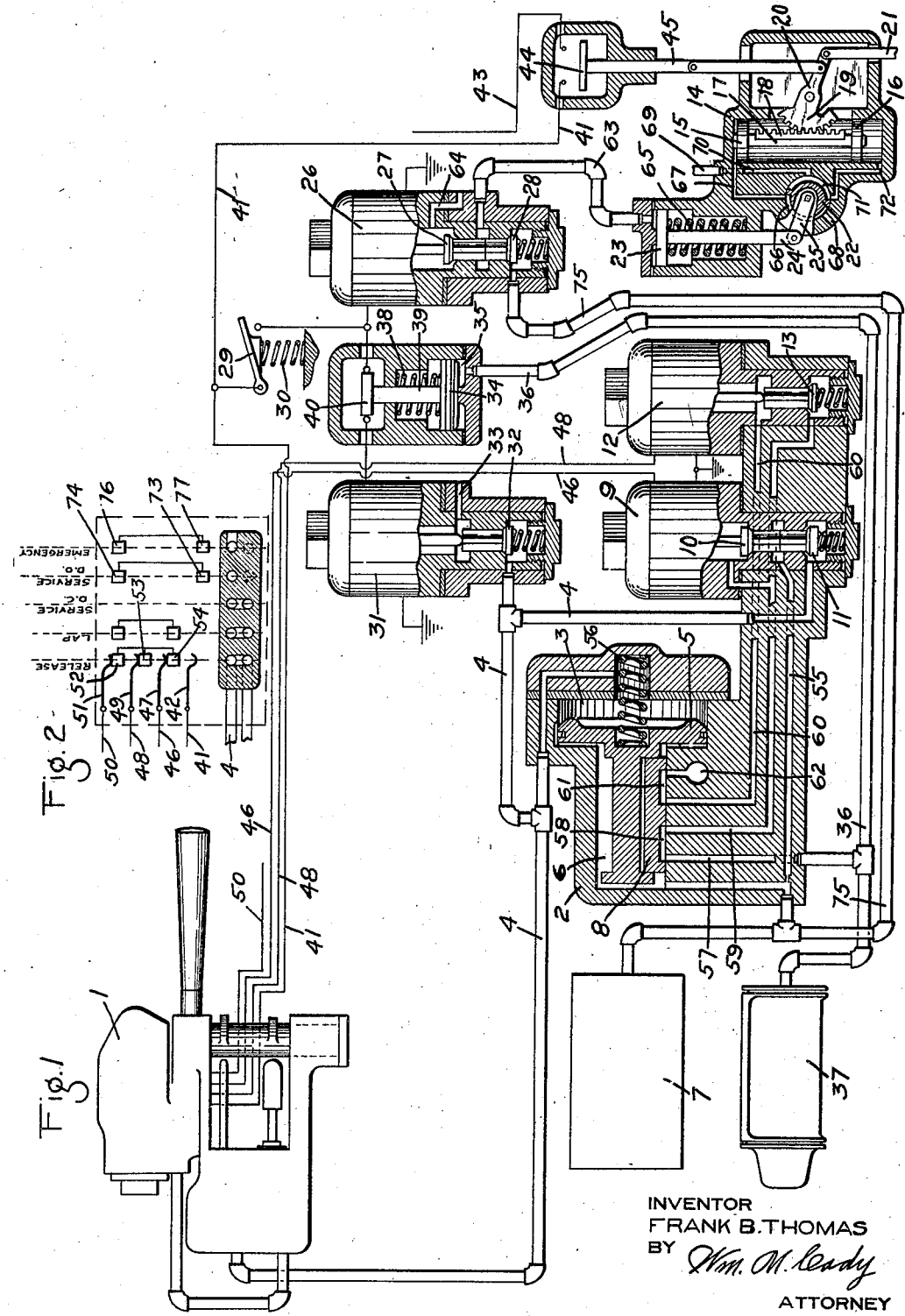
INVENTOR
FRANK B. THOMAS
BY *Wm. M. Cady*
ATTORNEY Patented Nov. 19, 1929

1,736,019

UNITED STATES PATENT OFFICE

FRANK B. THOMAS, OF WILKINSBURG, PENNSYLVANIA, ASSIGNOR TO THE WESTING-HOUSE AIR BRAKE COMPANY, OF WILMERDING, PENNSYLVANIA, A CORPORATION OF PENNSYLVANIA

DOOR AND BRAKE CONTROL DEVICE

Application filed April 23, 1928. Serial No. 271,990.

This invention relates to car door and brake controlling devices, and more particularly to an electro-pneumatically controlled door and brake controlling equipment.

One object of my invention is to provide means under the control of a passenger for preventing the release of the brakes.

Another object of my invention is to provide means under the control of a passenger for preventing the closure of a car door.

Another object of my invention is to provide means under the control of a passenger for preventing the opening of a car door.

Another object of my invention is to provide electrically controlled means under the control of a passenger for preventing, under certain conditions, the opening or closing of the car doors and the release of the brakes.

Other objects and advantages will appear in the following more detailed description of the invention.

In the accompanying drawing; Fig. 1 is a diagrammatic view, partly in section, of a car door and brake controlling equipment embodying my invention; and Fig. 2 a diagrammatic development of the door and brake controlling switch and brake valve device.

As shown in the drawing, the equipment may comprise a combined brake valve and brake switch device 1 for controlling the brakes and the car doors and said device may be similar to that disclosed in the pending application of Joseph C. McCune, Serial No. 235,450, filed November 25, 1927.

An emergency valve device 2 is provided comprising a casing having a piston chamber 3 connected to an emergency brake pipe 4 and containing a piston 5 and having a valve chamber 6, connected to a main reservoir 7 and containing a slide valve 8 adapted to be operated by piston 5.

For controlling the brakes electrically a service magnet valve device and a release magnet valve device are provided. The service magnet valve device comprises a magnet 9 and double beat valves 10 and 11 operable by said magnet, and the release magnet valve device comprises a magnet 12 and a valve 13 adapted to be operated by said magnet.

For controlling the opening and closing of the car doors a door engine 14 is provided comprising a casing having a piston cylinder containing pistons 15 and 16 which are connected together by a stem 17 carrying a rack bar 18. The teeth of the rack bar 18 mesh with the teeth of a gear segment 19.

The segment 19 is carried by a pivoted lever 20, to one end of which is connected a rod 21 for operating the car door. The supply and release of fluid under pressure to and from the pistons 15 and 16 is controlled by a rotary valve 22 and said valve is operable by a piston 23 having a stem 24 which is connected to the valve 22 by an arm 25.

A door engine magnet valve device controls the fluid pressure for operating the piston 23 and comprises a magnet 26 and double beat valves 27 and 28 adapted to be operated by said magnet. The circuit of magnet 26 is controlled by the movement of a treadle 29 which is normally held in a position to open the magnet circuit by a spring 30 and is adapted to close the circuit when a passenger leaving the car steps on the treadle.

A door and brake interlock magnet valve device is provided comprising a magnet 31 and a valve 32 adapted to be operated by said magnet. The valve 32 controls the venting of fluid under pressure from the emergency brake pipe 4 to an atmospheric exhaust port 33 and the circuit of said magnet is controlled by a pneumatically controlled switch device comprising a piston 34 having the chamber 35 at one side connected by a pipe 36 to the brake cylinder 37 and subject on the opposite side to the pressure of a coil spring 38. Secured to the piston 34 is a stem 39, carrying a switch member 40 for controlling the circuit of magnet 31, the magnet 31 being also in the circuit of magnet 26.

The circuit wire 41, which is connected to the magnets 26 and 31 by operation of the treadle 29 leads to a contact finger 42 in the brake valve and brake switch device 1 and said circuit wire may also be connected to a current supply wire 43 by operation of a switch member 44 which is carried by a rod 45, operatively connected to the door operating lever 20.

The circuit wire 46 of the service magnet 9 is connected to a finger 47 in the brake switch and the circuit wire 48 of the release magnet 12 is connected to a contact finger 49 in the brake switch. A current supply wire 50 is connected to a finger 51 in the brake switch.

In operation, when the brake valve and brake switch device 1 is in release position, the contact fingers 51, 49, and 47 register with contacts 52, 53, and 54, and said contacts being electrically connected, current is supplied through the wires 46 and 48, so as to energize the magnets 9 and 12. With the magnet 9 energized, the valve 10 is held seated and the valve 11 is unseated, so that fluid under pressure is supplied from the main reservoir 7 through passage 55 to the emergency brake pipe 4. The valve chamber 6 being open to the main reservoir and the piston chamber 3 being open to the emergency brake pipe which is charged with fluid at main reservoir pressure, the fluid pressures on opposite sides of piston 5 are balanced and the spring 56 shifts the piston 5 to its release position, as shown in the drawing.

The magnet 12 being energized, the valve 13 is held unseated, so that the brake cylinder is connected to the atmosphere through passage 57, cavity 58 in slide valve 8, passage 59, past the valve 13 to passage 60, and thence through cavity 61 in slide valve 8 to atmospheric exhaust port 62.

With the brake cylinder 37 at atmospheric pressure, the piston chamber 35 is at atmospheric pressure, so that spring 38 holds piston 34 in its lower position, in which the contact member 40 closes the circuit to the magnet 31. In release position of the brake switch, the circuit wire 41 is not supplied with current, so that even if the treadle 29 were depressed by a passenger on the car, current would not be supplied in release position to energize the magnets 31 and 26.

The magnet 26 being deenergized, the valve 28 is held seated, while the valve 27 is unseated, so that pipe 63, leading to piston 23 is connected to atmospheric exhaust port 64. The piston 23 being subject to atmospheric pressure, the spring 65 holds piston 23 in its upper position and the valve 22 in the position shown in the drawing, in which a cavity 66 connects passage 67, leading to piston 15 with an atmospheric exhaust port 68. Piston 16 is subject to fluid under pressure supplied from a source of fluid under pressure pipe 69 through passage 70, cavity 71 in valve 22 and passage 72.

The piston 16 being subject to fluid pressure, while piston 15 is subject to atmospheric pressure, the pistons will be held in their upper positions, in which the lever 20 operates through the rod 21 to hold the car door (not shown) closed. When the car door is closed, the rod 45 is positioned by lever 20, so that the contact member 44 does not close the circuit from the current supply wire 43 to the wire 41.

If the operator wishes to effect a service application of the brakes, without permitting the car door to be opened, he moves the brake switch to service position, doors closed. In this position, current is not supplied to the contact fingers 49, 47, and 42, so that the magnets 9 and 12 are deenergized.

With the magnet 12 deenergized, the valve 13 is permitted to seat, so that communication from the brake cylinder 37 to the exhaust is cut off. With the magnet 9 deenergized, the valve 11 is seated, while the valve 10 is unseated, so that fluid under pressure is supplied to the brake cylinder 37, from the main reservoir 7, through passage 55, past the open valve 10, passage 59, cavity 58 in slide valve 8, and passage 57.

The car doors cannot be opened in this position, even if a passenger steps on the treadle 29, since current is not supplied in this position to the contact finger 42 and the wire 41, and since, therefore, the magnet 26 cannot be energized. Fluid under pressure being supplied to the brake cylinder is also supplied to piston chamber 35 and when the brake cylinder pressure has been increased to a predetermined degree, the piston 34 will be shifted upwardly, so as to cause the circuit of magnet 31 to be opened by the movement of contact member 40.

If the operator wishes to permit the car door to be opened, he moves the brake switch to the service, doors open position, in which the contact finger 42 registers with contact 73, while contact finger 51 registers with contact 74. The contacts 73 and 74 being electrically connected, current is supplied to the wire 41.

Current supplied to wire 41 will not cause the energization of magnet 26 unless a passenger steps on and depresses the treadle 29 so as to close the circuit of magnet 26. If the treadle 29 is moved to close the circuit, then the magnet 26 will be energized, so that the valve 27 will be seated, while the valve 28 will be unseated.

The unseating of valve 28 permits the flow of fluid under pressure from the main reservoir 7 through pipe 75 to pipe 63 and thence to piston 23, so that piston 23 is shifted downwardly, rotating the valve 22, so that cavity 71 connects passage 70 with passage 67, thereby permitting the supply of fluid under pressure to piston 15, while passage 72 is connected through cavity 66 with exhaust port 68, so that the piston 16 is subjected to atmospheric pressure.

The pistons 15 and 16 then move downwardly, operating the lever 20 and thereby the rod 21 so as to open the car door. In this movement, the rod 45 is shifted upwardly, so that the contact member 44 closes the circuit from supply wire 43 to wire 41.

If the operator should attempt to close the car door by moving the brake switch from the service doors open to the service doors closed position, he will be unable to do so as long as a passenger holds the treadle 29 depressed, since, although the movement of the brake switch to the service doors closed position, cuts off the supply of current from the brake switch to the wire 41, current will still be supplied from the supply wire 43 through the contact member 44 to the wire 41 to maintain the magnet 26 energized.

When there is no passenger holding the treadle 29 depressed, the treadle will return to its normal position, in which the circuit to the magnet 26 is opened and the magnet 26 being thus deenergized, the valve 28 will be seated, while the valve 27 will be unseated. Fluid under pressure is then vented from piston 23, so that the piston 23 moves to its upper position, rotating the valve 22 to its position in which fluid under pressure is supplied to piston 16 while piston 15 is subjected to atmospheric pressure.

The pistons 15 and 16 then move to their upper position, operating the lever 20 to effect the closure of the car door.

If the operator should attempt to release the brakes while a passenger is holding the treadle depressed, the movement of the brake switch to release position will cause the magnets 9 and 12 to be energized, so that, as hereinbefore described, the brake cylinder 37 will be vented to the atmosphere by way of cavity 61 in slide valve 8 and atmospheric exhaust port 62, but as soon as the pressure in the brake cylinder has fallen to a predetermined degree, the piston 34 will be moved downwardly by spring 38 so as to close the circuit to magnet 31.

The circuit being closed by the depression of treadle 29, current supplied from the supply wire 43, through the contact member 44 to the wire 41 flows through the contact member 40 to energize the magnet 31.

When magnet 31 is energized, the valve 32 is unseated, so that fluid under pressure is vented from the emergency brake pipe 4 to the atmosphere, through port 33. The venting of fluid from the emergency brake pipe causes the emergency piston 5 to be shifted to its right hand position, in which passage 57 is opened to valve chamber 6, so that fluid under pressure is supplied from the main reservoir 7 to the brake cylinder to effect an emergency application of the brakes. It will thus be seen that if the operator should attempt to release the brakes, while a passenger is holding the treadle depressed, an emergency application of the brakes will be effected.

The brakes cannot be released until the passenger leaves the treadle 29 and permits same to move upwardly so as to open the circuit to the magnet 31. The magnet 31 being then deenergized, the valve 32 is moved to its seat and with the brake switch in release position, the magnets 9 and 12 are energized, so that valve 11 is unseated to permit flow of fluid from the main reservoir to the emergency brake pipe 4. The emergency piston 5 is then shifted to release position and the brakes are released in the manner hereinbefore described. The deenergization of magnet 26 also effects the operation of the door engine, so as to close the car door, by venting fluid under pressure from the piston 23 and the movement of the door engine to close the car door also operates the switch member 44 to open the circuit between the current supply wire 43 and the wire 41.

In the emergency position of the brake valve and brake switch device, the emergency brake pipe is vented to the atmosphere, so as to cause the operation of the emergency valve device 2 to effect an emergency application of the brakes and the contact finger 51 engages a contact 76, while contact finger 42 engages a contact 77 which is electrically connected to contact 76, so that current is supplied to the wire 41 and, consequently when a passenger depresses the treadle 29, a circuit is closed to energize the magnet 26, as in the service doors open position, and the car door is opened.

The source of fluid pressure supply pipe 69 may be the emergency brake pipe of a fluid pressure brake system, in which case when an emergency application of the brakes is effected, by reducing the pressure in the emergency brake pipe, the piston 16, being connected to the emergency, will be vented with the brake pipe, so that the pistons 15 and 16 will be balanced as to fluid pressure, thus permitting the car door to be opened or closed by a passenger on the car.

While one illustrative embodiment of the invention has been described in detail, it is not my intention to limit its scope to that embodiment or otherwise than by the terms of the appended claims.

Having thus described my invention, what I claim as new and desire to secure by Letters Patent, is:—

1. The combination with means for controlling a car door, of electrically controlled means for effecting the operation of said door controlling means to open the car door, manually controlled means for controlling the operation of said electrically controlled means, and means controlled by a passenger for permitting the operation of said electrically controlled means by said manually controlled means.

2. The combination with means for controlling a car door, of electrically controlled means for effecting the operation of said door controlling means to open the car door, manually controlled means for controlling the operation of said electrically controlled means, and a treadle for controlling the circuit of said electrically controlled means.

3. The combination with means for controlling a car door, of electrically controlled means operative upon energization for effecting the operation of said door controlling means to open the car door, a switch device operable by a passenger for closing the circuit to said electrically controlled means, and means controlled by the operator of the car for supplying current to energize said electrically controlled means when the circuit is closed by said switch device.

4. The combination with a door engine for controlling the opening and closing of a car door, of a piston device operated by fluid under pressure for controlling the operation of said door engine, electrically controlled means for controlling the fluid pressure on said piston device, and manually controlled means for controlling the operation of said electrically controlled means.

5. The combination with a door engine for controlling the opening and closing of a car door, of a piston device operated by fluid under pressure for controlling the operation of said door engine, electrically controlled means for controlling the fluid pressure on said piston device, manually controlled means for controlling the operation of said electrically controlled means, and a switch device operative by a passenger on the car for closing the circuit of said electrically controlled means.

6. The combination with a door engine for controlling the opening and closing of a car door, of electrically controlled means for effecting the operation of said door engine, manually controlled means for controlling the operation of said electrically controlled means, a switch device operable by a passenger for closing the circuit to said electrically controlled means, and a switch device operated upon movement of said door engine to open the car door for closing a circuit for supplying current to said electrically controlled means.

7. The combination with a door engine for controlling the opening and closing of a car door, of electrically controlled means for effecting the operation of said door engine, a manually operated switch device having a position for supplying current to energize said electrically controlled means, a switch device operated upon movement of said door engine to open the car door for supplying current to energize said electrically controlled means, and a switch device operable by a passenger on the car for closing the circuit from said manually operated switch device and from said door engine controlled switch device to said electrically controlled means.

8. In a brake equipment, the combination with apparatus for effecting the application and release of the brakes, of brake applying means operative upon releasing the brakes for effecting an application of the brakes and means operable by a passenger on the car for rendering said brake applying means effective to apply the brakes.

9. In a brake equipment, the combination with apparatus for effecting the application and release of the brakes, of auxiliary means for applying the brakes, means operated upon releasing the brakes for effecting the operation of said auxiliary means, and means operated by a passenger on the car for rendering said auxiliary means effective to apply the brakes.

10. In a brake equipment, the combination with a brake cylinder, of electrically controlled means for supplying fluid under pressure to the brake cylinder, a switch device normally closing the circuit to said electrically controlled means and operated by brake cylinder pressure for opening said circuit, and a switch device operable by a passenger on the car for also controlling the circuit to said electrically controlled means.

11. The combination with a brake cylinder, of a door engine for controlling the opening and closing of a car door, electrically controlled means for effecting the supply of fluid under pressure to the brake cylinder, a switch device normally closing the circuit to said electrically controlled means and operated by brake cylinder pressure for opening the circuit, a switch device operable by a passenger on the car for also closing the circuit, and a switch device operated upon movement of said door engine to the door open position for also closing the circuit to said electrically controlled means.

12. The combination with a brake cylinder and a door engine for controlling the opening and closing of a car door, of electrically controlled means operated upon energization for effecting the supply of fluid under pressure to the brake cylinder and means controlled by a passenger on the car and effective to energize said electrically controlled means when the door engine is in the door open position and fluid pressure is released from the brake cylinder.

13. The combination with a brake cylinder and a door engine for controlling the opening and closing of a car door, of electrically controlled means operated upon energization for effecting an application of the brakes, a switch device controlled by said door engine, a switch device controlled by a passenger on the car, and a switch device controlled by brake cylinder pressure, the energizing circuit for said electrically controlled means being controlled by said switch devices.

14. The combination with a brake cylinder and a door engine for controlling the opening and closing of a car door, of electrically controlled means operated upon energization for effecting an application of the brakes, a switch device controlled by said door engine, a switch device controlled by a passenger on the car, and a switch device controlled by brake cylinder pressure, said switches controlling the energizing circuit of said electrically controlled means and permitting energization of said electrically controlled means only when all three switch devices are in the circuit closing position.

In testimony whereof I have hereunto set my hand.

FRANK B. THOMAS.